C. E. P. JULIEN.
VEHICLE WHEEL.
APPLICATION FILED JAN. 26, 1920.
1,344,512. Patented June 22, 1920.
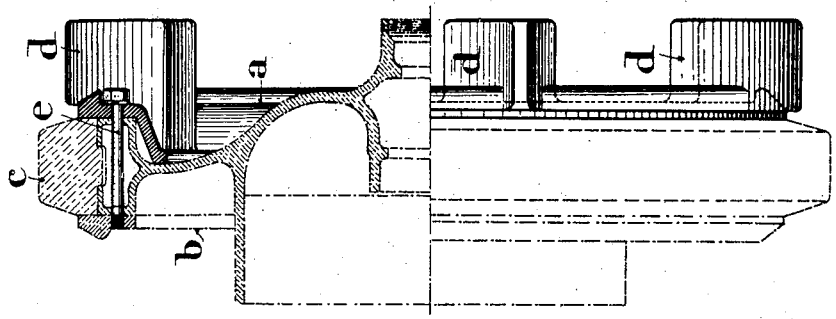
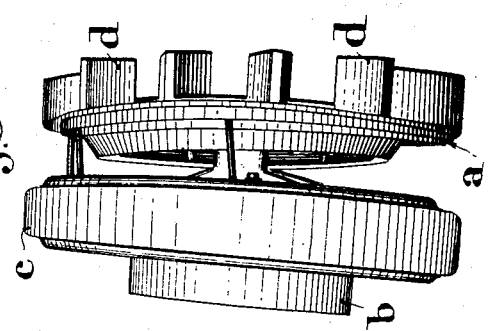
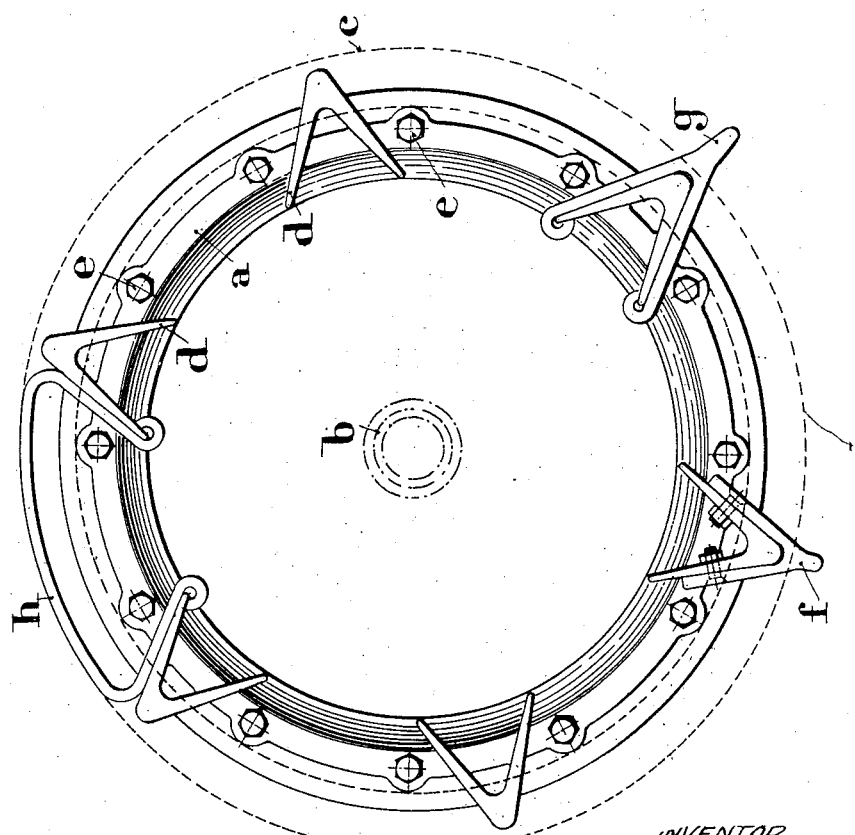
INVENTOR
CYPRIEN EDOUARD PAUL JULIEN
BY
ATTORNEYS

UNITED STATES PATENT OFFICE.

CYPRIEN EDOUARD PAUL JULIEN, OF PARIS, FRANCE.

VEHICLE-WHEEL.

1,344,512.　　　　Specification of Letters Patent.　　Patented June 22, 1920.

Application filed January 26, 1920. Serial No. 354,239.

*To all whom it may concern:*

Be it known that I, CYPRIEN EDOUARD PAUL JULIEN, a citizen of the French Republic, and residing in Paris, France, 41 Boulevard Haussmann, have invented certain new and useful Improvements in and Relating to Vehicle-Wheels, of which the following is a complete specification.

This invention has for its object to provide an additional wheel rim applicable to all kinds of vehicle wheels but intended more particularly for tractors, agricultural machines, and any automobile vehicles required to travel over various kinds of ground, such as hard roads and soft ground as in fields and the like.

The applicant has before proposed to construct a wheel having a plain tread provided on its internal surface with lateral V-shaped projections, which come into operation when the said tread sinks beyond its own thickness into soft ground.

The present invention consists in providing any desired number of these lateral V-shaped projections on a ring of suitable diameter, less than the external diameter of the tire of the vehicle wheel, said ring being preferably in one with said projections and being adapted to be applied laterally against any wheel and fixed thereto by suitable means in such a manner that the tire of the wheel whether metal or resilient material can travel over hard ground without the projections coming into action while on non-resisting or soft ground into which the tire sinks, said projections operate to render possible the progression of the vehicle.

These projections may serve also as supports or means of fixation for intermediary elements, of suitable form and material, effecting if desired an increase in the diameter of the tread and giving to the wheel supports independent of the tire.

In the accompanying drawing which shows, by way of example, one constructional form of the invention, Figure 1 is an elevation of a wheel provided with an additional rim in accordance with this invention.

Fig. 2 is a partial vertical section of Fig. 1.

Fig. 3 is a perspective view of a wheel with a tire and illustrating the mounting of an additional rim.

The invention comprises a ring *a* of a form suited to the vehicle wheel *b* on which it is desired to fix it, said ring being less in diameter than the tire *c* on which the wheel ordinarily travels.

This ring *a* is provided with any desired number of V-shaped projections *d*, preferably in one therewith, the legs of which are turned toward the center of the wheel. The ring *a* is also provided with holes for the passage of bolts *e* or other means serving to fix said ring to the wheel *b*.

The function of this additional rim is that as soon as the vehicle gets on to soft ground into which the ordinary wheel has a tendency to sink the said projections come into operation, dig themselves into the ground, and act energetically in proportion to the amount the wheel sinks in to overcome the resistance to traveling.

The V-shaped projections may be provided with additional removable parts, for example, in the form of blades *f* or teeth or spikes *g* (see Fig. 1) projecting beyond the tread and capable of biting into a resisting track such as frozen ground.

Between adjacent V-shaped projections there may also be mounted, without screw or bolts, intermediary elements of suitable form which effect an increase in the diameter of the tread and may, for example, be constituted as shown at *h* (see Fig. 1) by spring steel plates suitably bent back giving the wheel elastic supports independent of the tire *c*.

What I claim is—

1. An auxiliary wheel rim for wheels comprising a ring of less diameter than that of the tire and provided with inverted V-shaped lateral projections, and bow-shaped filling elements frictionally held between a pair of said lateral projections.

2. An auxiliary wheel rim comprising a ring adapted to be detachably secured to one side of the wheel, the greatest diameter of said rim being less than the external diameter of the tire of the wheel, an integral inwardly extending annular flange projecting from the lower end of said auxiliary rim and abutting the web of the wheel, and inverted V-shaped projections extending laterally from said rim, and means for detachably securing said rim to one side of the wheel.

3. An auxiliary wheel rim for wheels comprising a ring of less diameter than that of the tire and provided with inverted V- shaped lateral projections, and bow shaped filling elements frictionally held between a pair of said lateral projections, the arc of said elements lying flush with the circumference of the aforesaid tire tread.

4. In a vehicle wheel, a removable auxiliary rim secured to one side of the wheel said rim provided with spaced apart inverted V-shaped lateral projections, and filling elements adapted to be inserted between adjacent pairs of projections said elements included an arcuate tread member, and resilient side arms, said arms provided with gripping means at their free ends and frictionally engaging the free ends of the side arms of the said inverted V-shaped lateral projections.

In testimony whereof I have hereunto set my hand at Paris (France) this 29th day of December, 1919.

CYPRIEN EDOUARD PAUL JULIEN.

In the presence of two witnesses:
HENRY T. WILCOX,
EMILE BERTRAM.